United States Patent
Luo et al.

(10) Patent No.: US 8,439,299 B2
(45) Date of Patent: May 14, 2013

(54) ACTIVE CANCELLATION AND VIBRATION ISOLATION WITH FEEDBACK AND FEEDFORWARD CONTROL FOR AN AIRCRAFT ENGINE MOUNT

(75) Inventors: Huageng Luo, Clifton Park, NY (US); Craig Douglas Young, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1606 days.

(21) Appl. No.: 11/312,410

(22) Filed: Dec. 21, 2005

(65) Prior Publication Data

US 2007/0138338 A1 Jun. 21, 2007

(51) Int. Cl.
*B64D 27/00* (2006.01)
(52) U.S. Cl.
USPC .......................................................... 244/54
(58) Field of Classification Search .................. 244/1 R, 244/53 R, 54, 55
See application file for complete search history.

(56) References Cited

U.S. PATENT DOCUMENTS

| | | | | |
|---|---|---|---|---|
| 5,065,959 A | * | 11/1991 | Bhatia et al. .................. 244/54 |
| 5,219,143 A | | 6/1993 | Staple et al. | |
| 5,226,500 A | | 7/1993 | Doi et al. | |
| 5,551,650 A | * | 9/1996 | Southward et al. .......... 244/54 |
| 5,845,236 A | * | 12/1998 | Jolly et al. .................. 702/195 |
| 5,873,559 A | | 2/1999 | von Flotow et al. | |
| 5,954,169 A | * | 9/1999 | Jensen .......................... 188/378 |
| 6,002,778 A | * | 12/1999 | Rossetti et al. ............. 381/71.4 |
| 6,009,985 A | * | 1/2000 | Ivers ............................. 188/380 |
| 2002/0060268 A1 | * | 5/2002 | Smith et al. ................... 244/54 |

FOREIGN PATENT DOCUMENTS

| | | |
|---|---|---|
| EP | 0501659 | 5/1995 |
| GB | 2242762 | 10/1991 |
| GB | 2404716 | 2/2005 |
| GB | 2242762 | 3/2005 |
| JP | 61222819 | 10/1986 |
| JP | 3213428 A | 9/1991 |
| JP | 4354006 A | 12/1992 |
| WO | WO9806089 A1 | 2/1998 |

OTHER PUBLICATIONS

GB0625291, GB Search Report, Apr. 16, 2007.
French Search Report dated Mar. 24, 2011 and Written Opinion.

* cited by examiner

*Primary Examiner* — Philip John Bonzell
(74) *Attorney, Agent, or Firm* — Scott J. Asmus

(57) ABSTRACT

An engine mount structure is provided with active vibration mechanisms which are attached in the vicinity of the engine mount to prevent engine vibrations from propagating into the engine mounting structure, for example, the wing or fuselage structure of an aircraft. Additionally, sensors are provided on the engine and/or wing/fuselage structure to provide control signals to the active vibration mechanisms so that the active vibration mechanism react to the sensed data to minimize the vibration transmissibility from the engine into the wing/fuselage.

18 Claims, 7 Drawing Sheets

ACTIVE CANCELLATION AND VIBRATION ISOLATION WITH FEEDBACK AND FEEDFORWARD CONTROL FOR AN AIRCRAFT ENGINE MOUNT

BACKGROUND OF THE INVENTION

This invention relates to an apparatus and method for providing active vibration isolation at an engine mount to prevent engine vibration from propagating from an aircraft engine into the wings and fuselage of an aircraft.

In aircraft cabins, tonal noise is generated by the fundamental frequencies of engine rotations. The generation of this noise has been an issue for many years. The tonal noise is caused by residual imbalances in the engines rotating parts, such as low and high speed turbines, fan blades, compressors, etc. Even though the imbalance from rotating parts, including shafts and blades, are closely controlled in manufacturing, due to improved manufacturing methods, the imbalance can still develop due to changes in operation, or through deterioration of the system over time. As a result, significant "once-per-revolution" vibration excitations from the rotating components are introduced into engine operations.

It is these kinds of vibrations which propagate through wing and/or fuselage structure and produce annoying low frequency tonal noise in the aircraft cabin.

This tonal noise is usually a major contributor to the overall cabin noise level. According to many noise evaluation standards, additional penalties will be applied to the overall noise level if significant tonal noise exists. These tones are usually in a low frequency range. For example, engines powering mid to larger commercial aircraft usually have less than 100 Hz low pressure (LP) system 1/rev frequency and less than 200 Hz high pressure (HP) system 1/rev frequency. For small aircraft such as regional jets, the LP system 1/rev is around 100 Hz, and the HP system 1/rev is about 300 Hz. Psychoacoustics analysis indicates that an individual can be easily fatigued if exposed to low frequency noises, especially with long time exposure, such as in the long range air travel.

It is understood that these tonal vibrations cannot be avoided. In engine manufacturing, the rotating components are balanced carefully. However, during the operation, the balance can change, introducing an imbalance into the structure. The system deterioration with service time can also introduce imbalance. The imbalance-induced vibrations transmit through the engine mount, wing structures, fuselage structures, and finally excite the cabin interior structures, such as trim panels. The vibration of the interior structure propagates the noise into the cabin.

Traditionally, "soft" (i.e. flexible or shock absorbing) engine mounts have been the least expensive and most effective way to reduce the vibration transmission. However, for large commercial aircraft, the engine vibration frequency can be as low as 45 Hz, which means that the soft mount isolator needs to be designed to have resonance much less than 45 Hz. Such a "soft" mount design results in a large displacement during the engine speed up, which is undesirable and air frame manufacturers wish to avoid. Further, the reliability and durability of soft engine mounts is an issue, as their reliability and durability are less than hard engine mounts.

Therefore, there still exists a need to reduce tonal noise generation in applications where a hard engine mount is used.

SUMMARY OF THE INVENTION

In an embodiment of the present invention, active vibration mechanisms are attached in the vicinity of the engine mounts to prevent engine vibrations from propagating into the engine mounting structure, for example, the wing or fuselage structure, depending how the engines are mounted. In an embodiment, the active vibration mechanisms are powered actuators attached to the structure in the vicinity of, or embedded within, the engine mount to inject anti-vibration movements to cancel the tonal vibrations generated by the engine. In another embodiment, the active vibration mechanisms are powered actuators attached to the structure in the vicinity of, or embedded within, the engine mount to dissipate the dynamic energy of the tonal vibrations generated by the engine.

In an embodiment of the present invention, vibration sensors are placed on the engine and/or fuselage and/or wing structure to monitor the vibration performance of the engine and engine mount structure. The data from these sensors, along with engine speed signals, are used to determine the instant fundamental frequencies of the rotating components and the engine, such as the turbine shafts, etc. These determined fundamental frequencies are then used to generate anti-vibration signals which are transmitted to the power actuators, which create anti-vibration movements or equivalent dynamic energy absorbers to cancel or alleviate the determined fundamental frequency vibrations and their higher order harmonics, as needed.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
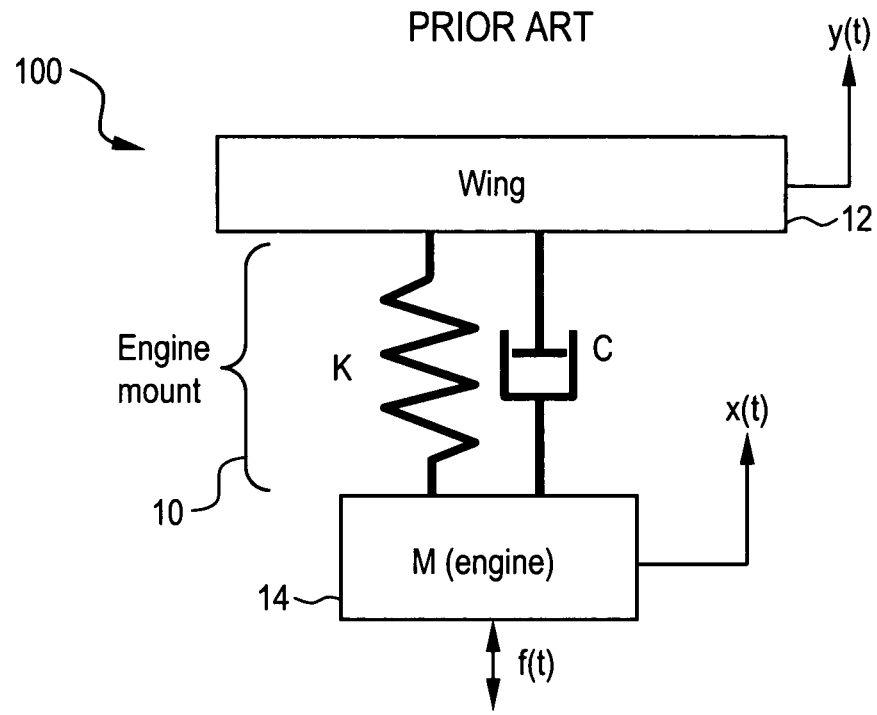
FIG. 1 is a diagrammatical representation of a hard engine mount structure.
Figure 2:
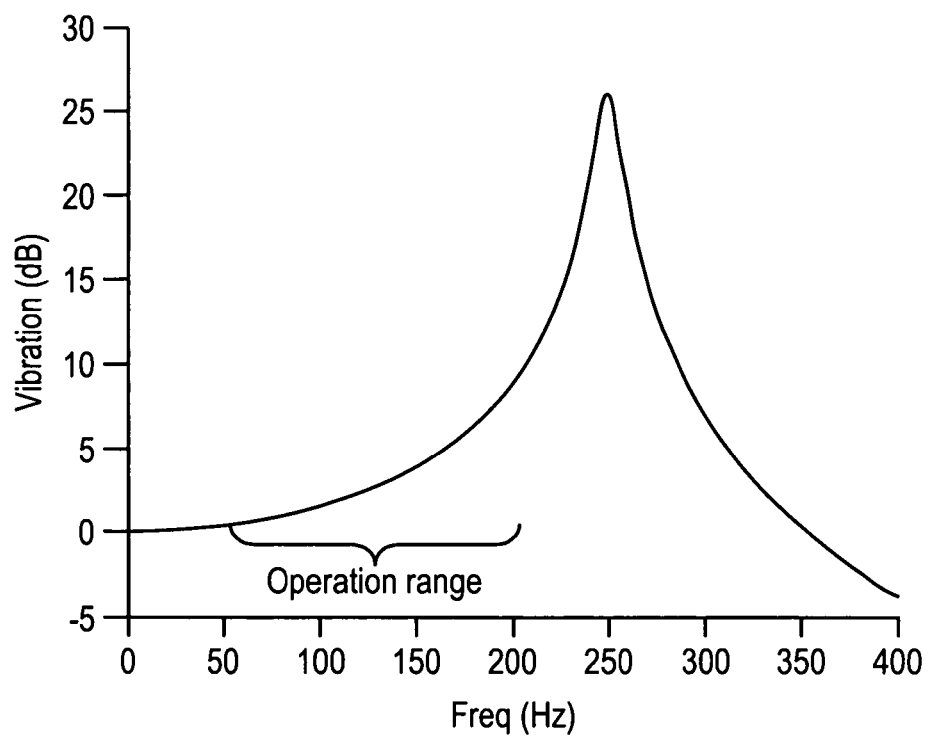
FIG. 2 is a graphical representation of the transmissibility of the hard mounted engine structure shown in FIG. 1.
Figure 3:
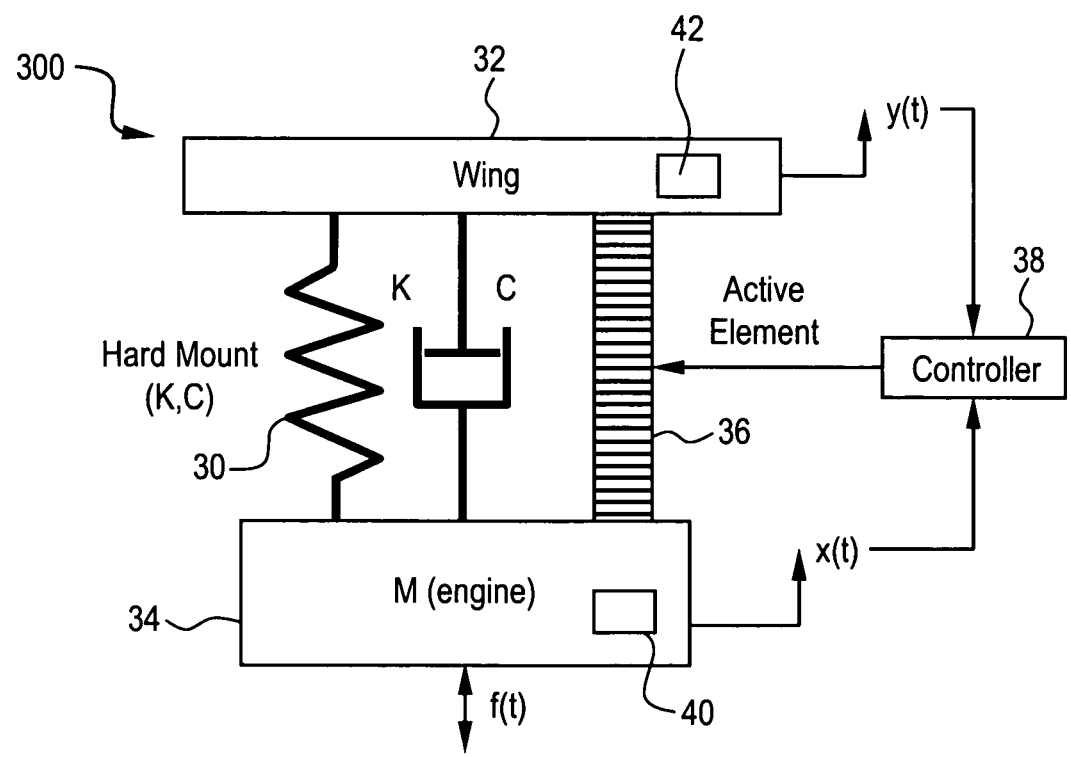
FIG. 3 is a diagrammatical representation of an engine mount structure according to an embodiment of the present invention.
Figure 4:
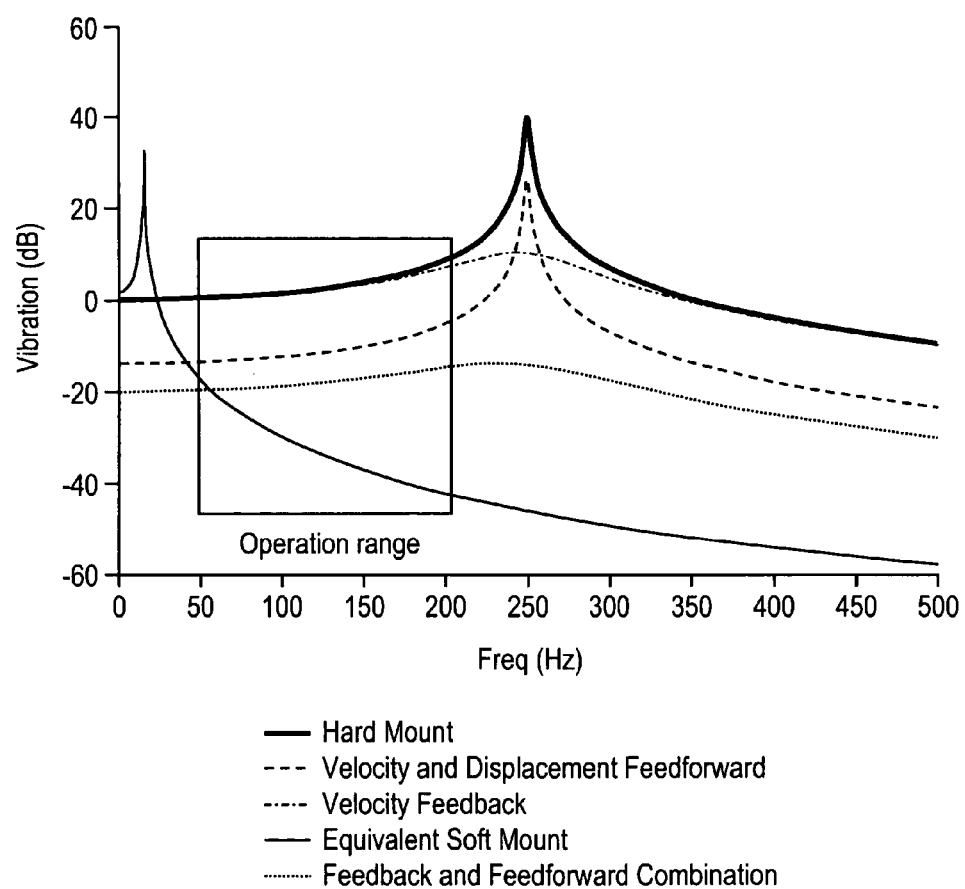
FIG. 4 is a graphical representation of the transmissibility of an engine mount having various vibration control strategies, including embodiments of the present invention.
Figure 5:
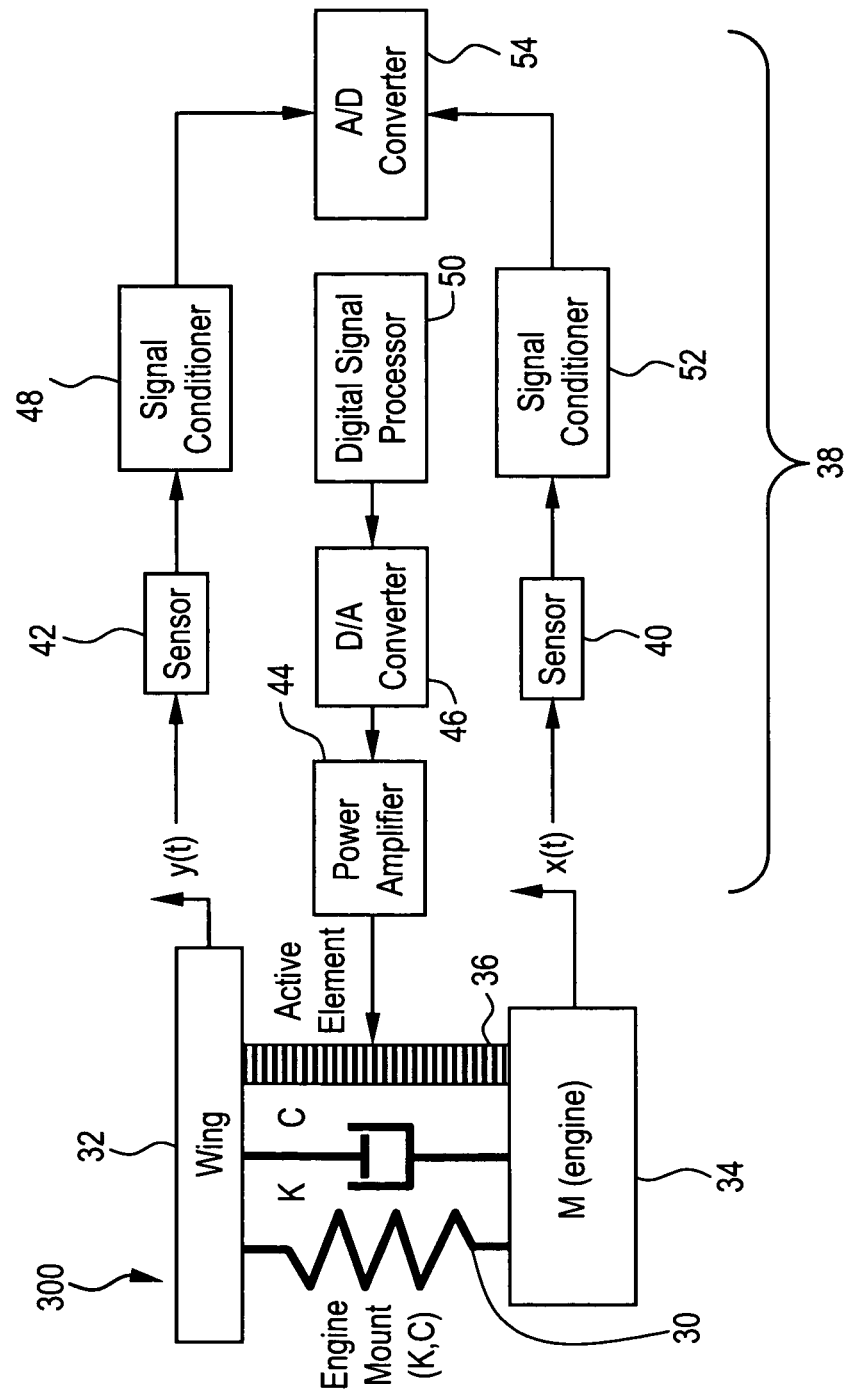
FIG. 5 is a diagrammatical representation of a control system for an embodiment of the present invention.
Figure 6:
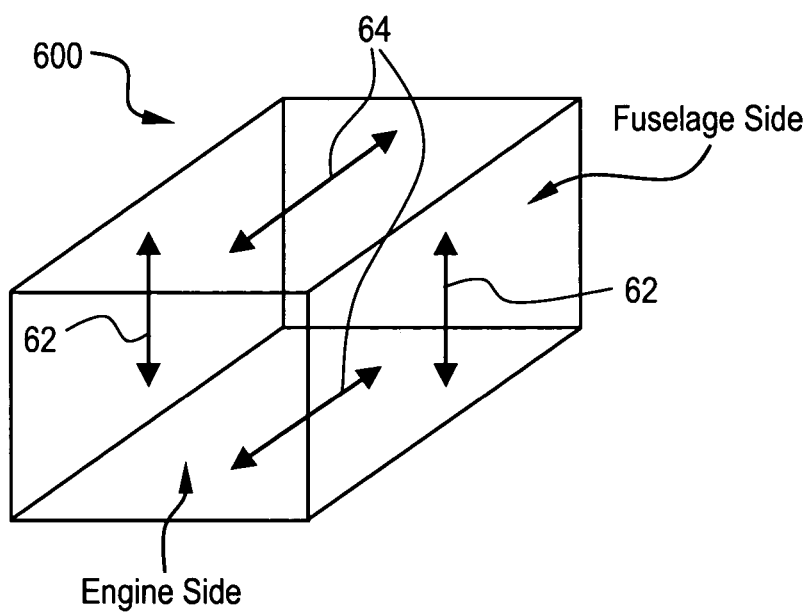
FIG. 6 is a diagrammatical representation of a fuselage to engine mount of the present invention.
Figure 7:
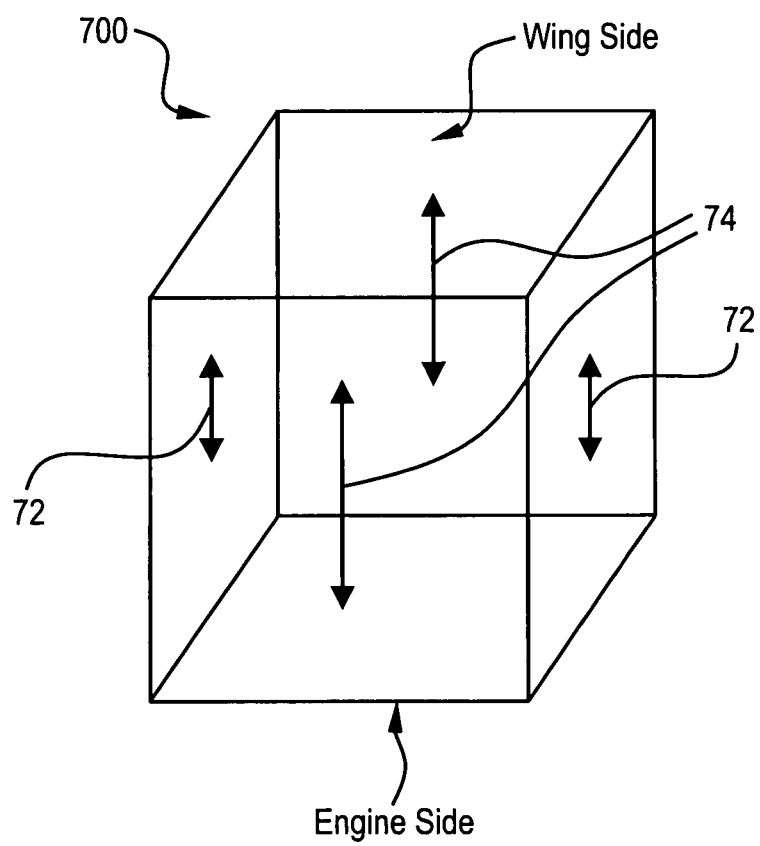
FIG. 7 is a diagrammatical representation of a wing to engine mount of the present invention.

FIG. 1 depicts a hard engine mount conventionally known, and FIG. 2 shows the transmissibility of the hard engine mount, represented as vibration (dB) v. frequency (Hz). FIG. 3 depicts an engine mount 300 having an active element according to an embodiment of the present invention, while FIG. 5 depicts an engine mount according to an embodiment of the present invention, including a representation of a control system for the engine mount. FIG. 4 depicts the transmissibility (vibration v. frequency) of various engine mount configurations and methods. FIGS. 6 and 7 depict simplified representations of an engine mount to a fuselage and wing, respectively, according to embodiments of the present invention.

Turning now to FIG. 1, a conventional hard engine mount structure 100 is represented as a single degree of freedom system. The engine mount structure 10, which couples the engine 14 to the wing 12 (which can also be a fuselage or other structure) is represented by a spring, having a spring stiffness K, and a dashpot, having a viscous dampening coefficient C. During engine operation the engine 14 vibrates and moves relative to the wing 12, which also has vibration and movement. The dynamic equation for this system is represented by the equation:

$$M\ddot{x} + C(\dot{x}-\dot{y}) + K(x-y) = f(t) \qquad \text{Eq.(1)}$$

where M is the mass of the engine 14, x is the displacement of the engine 14 and y is the displacement of the wing 12 in the single degree of freedom, additionally, the corresponding transmissibility in frequency domain can be written as $$\frac{Y(j\omega)}{X(j\omega)} = \frac{jC\omega + K}{-M\omega^2 + jC\omega + K} \qquad \text{Eq. (2)}$$

$$= \frac{j\zeta\omega\omega_0 + \omega_0^2}{\omega_0^2 - \omega^2 + j\zeta\omega\omega_0}$$

where $$\omega_0^2 = \frac{K}{M}, \text{ and } \zeta = \frac{C}{2M\omega_0} \qquad \text{Eqs. (3) and (4)}$$

As shown in FIG. 2, for a hard mount, the transmissibility in the engine operation range is always larger than one, or larger than 0 dB in the logarithm scale. In cases such as these, the vibration induced by engine operations will be amplified and transmitted to the wing and/or fuselage and eventually transmitted into cabin in forms of vibration and noise.

The present invention reduces the transmissibility of the engine vibrations to the wing/fuselage by adding at least one active element in parallel to the engine mount structure. The active element is controlled based on the responses from motion/vibration sensors which are placed before and/or after the engine mount structure such that the transmissibility is reduced in the engine operation range.

FIG. 3 depicts an engine mount structure according to an embodiment of the present invention. Similar to FIG. 1, the engine mount 30 is represented by a spring, having a spring stiffness K, and a dashpot, having a viscous dampening coefficient C. The engine mount 30 couples the engine 34 to the wing 32 (which may also be a fuselage or other structure). Additionally, the present invention includes at least one active vibration element 36, which is coupled to a controller 38.

In an embodiment of the present invention, the active vibration element 36 is capable of operating at a frequency comparable to the operational frequency or frequencies of the engine 34, and is capable of delivering force sufficient to counteract and/or alleviate the engine vibrations. This allows the active vibration element 36 to sufficiently counteract the vibrations induced by the engine. In one embodiment of the present invention, the active vibration element 36 is a stack of piezoelectric elements. In alternative embodiments, other actuator types may be used, including, but not limited to, electrical actuators.

Further, as shown in FIG. 3, at least one vibration or motion sensor 40 is mounted on the engine 34, and at least one vibration or motion sensor 42 is mounted in the wing (or fuselage) 32. In an alternative embodiment, a sensor 42 is only placed on the wing (or fuselage) 32, and no sensor is placed on the engine. The sensors 40, 42 are placed in the vicinity of the engine mount 30 so as to optimizing sensing of the vibrations. In a further embodiment, a sensor 40 is only placed on the engine 34, and no sensor is placed in the wing (or fuselage) 32.

In the present invention, it is contemplated that various sensor types can be used. For example, it is contemplated that accelerometers, velocity sensors, displacement sensors, strain gauges and deformation gauges, among other conventionally known sensors types, may be used on either the wing (or fuselage) 32 and/or the engine 34. In an additional embodiment of the present invention, a different sensor type is used on the engine 34 and the wing (or fuselage) 32 to optimize sensor and system performance.

During operation, the present invention employs a reactive process to actuate the active vibration element(s) 36 to minimize the responses by the sensors 40 and 42. The minimization of sensor responses is a result of minimization of vibrations transferred from the engine 34 to the wing (or fuselage) 32, because of the activation of the active vibration element(s) 36. Essentially, the sensors 40 and 42 transmit vibration data, which is used by a control system (discussed below) to active the element(s) 36 in such a way to minimize the vibration sensed by the sensors 40 and 42. In one embodiment, the control signals to the element(s) 36 are constantly changed, based on the signals from the sensors. In a further embodiment, some of the constants and/or the transfer function may be fixed, based on the vibration performance characteristics of the structure, to reduce the overall computations necessary but to minimize vibration transmission.

The present invention will now be further explained in conjunction with the following equations.

In general, the dynamics equation for the engine mount structure 300 is changed from the equation set forth above (regarding FIG. 1), to:

$$\begin{cases} M\ddot{x} + C(\dot{x} + \dot{y}) + K(x - y) = f(t) + f_{act}(t) \\ f_{act} = \alpha\ddot{x} + \beta\dot{x} + \chi x + \delta\ddot{y} + \varepsilon\dot{y} + \phi y \end{cases} \qquad \text{Eq. (5)}$$

where $f_{act}$ is the calculated actuator force, and the transmissibility in the frequency domain becomes:

$$\frac{Y(j\omega)}{X(j\omega)} = \frac{-\delta\omega^2 + j(C+\varepsilon)\omega + (K+\phi)}{-(M-\alpha)\omega^2 + j(C-\beta)\omega + (K-\chi)} \qquad \text{Eq. (6)}$$

$$= \frac{\gamma\omega_{c0}^2 - \eta\omega^2 + j\kappa\zeta_{c0}\omega\omega_{c0}}{\omega_{c0}^2 - \omega^2 + j\zeta_{c0}\omega\omega_{c0}}$$

In Eq. 6, the parameters $\alpha$, $\beta$, $\chi$, $\delta$, $\epsilon$, $\phi$ are control parameters which represent the gain in the system for active vibration element(s) 36. In an embodiment of the invention, these parameters are automatically adjusted so that the ratio Y/X is minimized. More specifically, a goal is to minimize Y, thus minimizing the vibrations transmitted to the cabin, to create undesirable noise levels.

In another embodiment, any number of these control parameters may be fixed in value, to reduce the overall computations necessary. The fixed value(s) are determined based on the historical and/or analytical vibration performance of the engine mount structure, and the desired level of vibration minimization.

Additionally, the parameters $\gamma$, $\eta$, and $\kappa$ are defined as follows:

$$\gamma = \frac{K+\phi}{K-\chi}, \eta = \frac{\delta}{M-\alpha}, \kappa = \frac{C+\varepsilon}{C-\beta} \qquad \text{Eqs. 7, 8 and 9}$$

where, $\omega_{c0} = \sqrt{\dfrac{K-\chi}{M-\alpha}}$ (Eq. 10) is the active mount resonance frequency, and $\zeta_{c0} = \dfrac{C-\beta}{2(M-\alpha)\omega_{c0}}$ (Eq. 11) is the active mount damping ratio.

In an embodiment of the present invention, the control parameters $\alpha, \beta, \chi, \delta, \varepsilon, \phi$ are adjusted using feedback data from the wing (or fuselage) sensor 42 and using feedforward data from the engine sensor 40. In a further embodiment, the control parameters are adjusted based on feedback data from the wing (or fuselage) sensor 42.

In an embodiment of the present invention, both the x and y parameters are monitored to determine the proper control function(s) for the active vibration element(s) 36. In a further embodiment, only y is monitored, using the sensor 42, and the feedback of this sensor 42 is used to determine the proper control functions for the element(s) 36. In an further alternative embodiment, only x is monitored (using the engine sensor 40) and a predetermined transfer function, which is determined based on testing and/or structural characteristics, is used to determine the proper control function(s) for the active vibration element(s) 36. The predetermined transfer function optimizes the ratio X/Y based on the detected x and/or y values.

FIG. 4 graphically depicts vibration transmission during engine operation using various methods of vibration control, including alternative embodiments of the present invention. As shown in this figure, using negative velocity and negative position feedforward data, from an engine mount sensor 40, the transmission coefficient function is similar the using only a hard mount, but the transmissibility in the engine operational range is lower.

Further, as shown, by using negative velocity feedback data, additional damping can be added to the resonance frequencies. Although it is recognized that this embodiment may create a moderate reduction on the operational range transmissibility, this embodiment suppresses any potential resonance amplification in the engine operational range.

In an additional embodiment, the negative velocity and negative position feedforward data are combined with negative velocity feedback to provide more transmission reduction in the operational range.

In a further alternative embodiment, positive position feedback data and negative acceleration feedback data are used to create an engine mount structure which is essentially equivalent to an engine soft mount, in that the vibration transmissibility is greatly reduced in the operation range, while maintaining the static deflection small.

It is noted that the alternatives shown above, regarding FIG. 4, are exemplary embodiments, and the present invention contemplates various combinations of sensor types and sensor data to be used to minimize vibration transmissibility to the wing/fuselage structure.

Turning now to FIG. 5, the operation of an embodiment of the present invention will now be described, along with an exemplary control system. The embodiment shown in FIG. 5 is an embodiment using both feedback (wing/fuselage side) data from the sensor 42 and feedforward (engine side) data from the sensor 40. However, as discussed above, the present invention is not limited to this embodiment, as the present invention contemplates using only feedback data from the sensor 42.

As shown and discussed above, the sensors 40, 42 detect vibration or movement from the engine 34 and the wing (or fuselage) 32 to provide feedback and feedforward data, respectively. The signals from the sensors 40, 42 are sent to signal conditioners 52 and 48, respectively. In an embodiment where the sensors 40 and 42 are of different types, the signal conditioners may be different, as needed.

After the signals have been conditioned, they are converted from analog to digital, via the A/D converter 54. Then the digital signal processor 50 gets the digitized signals and applies the required control strategies, and the control authority is determined through digital signal processing. Following the digital signal processor 50, the D/A converter 46 converts the processed signal from digital to analog so it may be used to control the active vibration element 36, after the signal is amplified by the power amplifier 44.

In an embodiment of the present invention, the engine mount block structure is the major load path from the engine 34 to the wing (or fuselage) 32, and the active vibration elements 36 are embedded in the engine mount block structure. However, it is contemplated that a different element mount structure may be used based on the specific engine mount structure and the applications of the present invention.

Examples of the varying embodiments are shown in FIGS. 6 and 7. FIG. 6 depicts an embodiment of an engine mount block 600 of the present invention, where four active vibration elements are embedded within the mount block 600, which is used to couple an engine with a fuselage. As shown, two active vibration elements 62 are used for controlling lateral vibrations, while two additional active vibration elements 64 are used for controlling vertical vibrations (i.e. along a line extending from the engine to the fuselage). As indicated above, the active vibration elements 62 and 64 are of an actuator type which is capable of operating at a frequency comparable to that of the engine. Further, although the elements 62 and 64 are shown embedded within the block 600, the present invention contemplates that the elements 62 and 64 can also be placed in the vicinity of the block 600. The construction and structure of the engine mount block 600 are not limited by the present invention.

Similar to FIG. 6, FIG. 7 depicts an engine mount block 700 according to another embodiment, where the block 700 couples an engine to a wing structure. Again, active vibration elements are used to control vibration in both lateral 72 and vertical 74 directions.

Further, it is noted that although the FIG. 6 and FIG. 7 embodiments have been shown with four active vibration elements, where two are position for lateral and vertical vibration, respectively, the present invention is not limited to such a configuration. Specifically, the number and orientation of the active vibration elements may be optimized to achieve the maximum operational benefit based on the specific structural configuration. For example, if it is determined that a specific engine mount structure has a dominant vibration in only one direction, the active vibration element(s) may be oriented in only that one direction. Additionally and alternatively, the present invention contemplates controlling vibration and movement in all axes, depending on the vibration performance of the structure.

Although the above discussion has been primarily directed to the use of the present invention in conjunction with aircraft engines, those of ordinary skill in the art will recognize that the present invention may be used with any application where an engine or a rotating machinery creates or otherwise causes a low frequency vibration in structure to which it is mounted.

Moreover, although the above discussion has also been primarily directed to hard engine mounts, the present invention is not limited to this application, but may also be used in conjunction with soft engine mounts, in those applications where soft engine mounts are operationally acceptable.

Further, while the invention has been described in terms of various specific embodiments, those skilled in the art will recognize that the invention can be practiced with modification within the spirit and scope of the claims.

What is claimed is:

1. An engine mount vibration control system; comprising:
   at least one engine mount which couples an engine to an engine support structure;
   at least one active vibration element positioned in the vicinity of said at least one engine mount such that said at least one active vibration element provides an actuation force on at least one of said engine and said support structure;
   at least one vibration sensor mounted on said engine to detect a vibration in said engine;
   at least one vibration sensor mounted on said support structure to detect a vibration in support structure; and
   a controller which receives a signal from said at least one sensor and controls said at least one active vibration element based on said received signal from said at least one vibration sensor;
   wherein the controller is configured to adjust control parameters using a combined feedback and feedforward control.

2. The engine mount vibration control system set forth in claim 1, wherein said at least one active vibration element is embedded in said at least one engine mount.

3. The engine mount vibration control system set forth in claim 1, further comprising at least one additional vibration sensor mounted on the other of said engine and said support structure to detect another vibration in the other of said engine and said support structure, and
   said controller receives a signal from said at least one additional vibration sensor and controls said at least one active vibration element based on said received signals from each of vibration sensors.

4. The engine mount vibration control system set forth in claim 1, wherein said vibration sensor is one of an accelerometer, velocity sensor, displacement sensor, strain gauges and deformation gauge.

5. The engine mount vibration control system set forth in claim 1, wherein said engine is an aircraft engine and said support structure is a portion of one of a wing or fuselage.

6. The engine mount vibration control system set forth in claim 1, wherein said engine mount is a hard engine mount.

7. The engine mount vibration control system set forth in claim 1, wherein a displacement of said engine in a first direction is defined as x and a displacement of said support structure in said first direction is defined as y, and said controller controls said at least one active vibration element to minimize the ratio y/x.

8. The engine mount vibration control system set forth in claim 1, further comprising a plurality of said active vibration elements which are controlled by said controller.

9. The engine mount vibration control system set forth in claim 8, wherein at least some of said plurality of said active vibration elements have a different orientation with respect to at least one other of said active vibration elements.

10. A method of controlling vibration of an engine mount system; comprising;
    sensing a vibration of an engine and sensing a vibration of a support structure to which the engine is mounted;
    providing at least one actuation force to at least one of said engine and said support structure based on said sensing step to minimize vibration transmission from said engine to said support structure; and
    adjusting control parameters of the actuation force based on a combined feedback and feedforward control.

11. The method of claim 10, wherein said at least actuation force is provided by at least one active vibration element which is controlled based on said sensing step.

12. The method of claim 10, wherein said at least one actuation force is continuously adjusted during operation of said engine to minimize vibration transmission from said engine to said support structure.

13. The method of claim 10, wherein said at least one actuation force is determined to minimize the ratio y/x, where x is a displacement of said engine in a first direction and y is a displacement of said support structure in said first direction.

14. The method of claim 10, wherein said engine is an aircraft engine and said support structure is at least a portion of either of a fuselage or wing.

15. The method of claim 10, wherein said sensing is performed by a plurality of sensors, where at least one of said sensors is mounted in each of said engine and support structure, respectively.

16. The method of claim 15, wherein a plurality of actuation forces are provided to either of said engine and support structure in a plurality of directions based on said sensing step.

17. The method of claim 10, wherein a plurality of actuation forces are provided to either of said engine and support structure in a plurality of directions based on said sensing step.

18. The method of claim 17, wherein said plurality of actuation forces are provided by a plurality of active vibration elements, which are oriented differently with respect to each other.

* * * * *